Oct. 17, 1961  F. MOORE  3,004,747
TRACER FOR AUTOMATIC TWO-DIMENSIONAL FOLLOWER CONTROL
Original Filed Oct. 19, 1956  5 Sheets-Sheet 1

Fig. 1
Fig. 2

INVENTOR.
FRANK MOORE
BY
Robert A. Sloman
ATTORNEY

INVENTOR.
FRANK MOORE
BY
Robert A. Sloman
ATTORNEY

Oct. 17, 1961   F. MOORE   3,004,747
TRACER FOR AUTOMATIC TWO-DIMENSIONAL FOLLOWER CONTROL
Original Filed Oct. 19, 1956   5 Sheets-Sheet 5

INVENTOR.
FRANK MOORE
BY
Robert A. Sloman
ATTORNEY

United States Patent Office 3,004,747
Patented Oct. 17, 1961

3,004,747
TRACER FOR AUTOMATIC TWO-DIMENSIONAL FOLLOWER CONTROL
Frank Moore, Detroit, Mich., assignor to Manuel Turchan, Dearborn, Mich.
Original application Oct. 19, 1956, Ser. No. 617,052, now Patent No. 2,891,384, dated June 23, 1959. Divided and this application Oct. 3, 1957, Ser. No. 688,062
6 Claims. (Cl. 251—3)

This is a division of my co-pending application, Serial No. 617,052, filed October 19, 1956, now Patent No. 2,891,384.

This invention relates to an automatic two-dimension follower control by tracer deflection angle, and more particularly to an automatic control mechanism for use in conjunction with a duplicating device whereby the tracer responds to the profile of a template as it traverses said template and automatically controls relative movements between a pair of right angularly related slides and a cutting tool on one of said slides produces in a workpiece a shape exactly corresponding to said profile.

It is the object of this invention to provide a novel tracer construction, which not only includes a moveable valve responsive to deflections of the tracer spindle, but also includes a series of electrical switches providing automatic control for switching tracer control from one of two right angularly related slides, to the other, and switching constant feeding from such other slide to said first slide.

It is a further object of this invention to provide an electrical system in conjunction with a fluid control system whereby the angle of deflection of the tracer as it responds to the contour of the template will provide an automatic control for the tracer and for a cutter associated therewith for movement in unison for automatically reproducing in a workpiece the contour of a template throughout 180 or 360 degrees.

These and other objects will be seen from the following specification and claims in conjunction with the appended drawings in which:

It will be understood that the above drawings illustrate merely a preferred embodiment of the invention and that other embodiments are contemplated within the scope of the claims hereafter set forth.

Figures 1, 2:
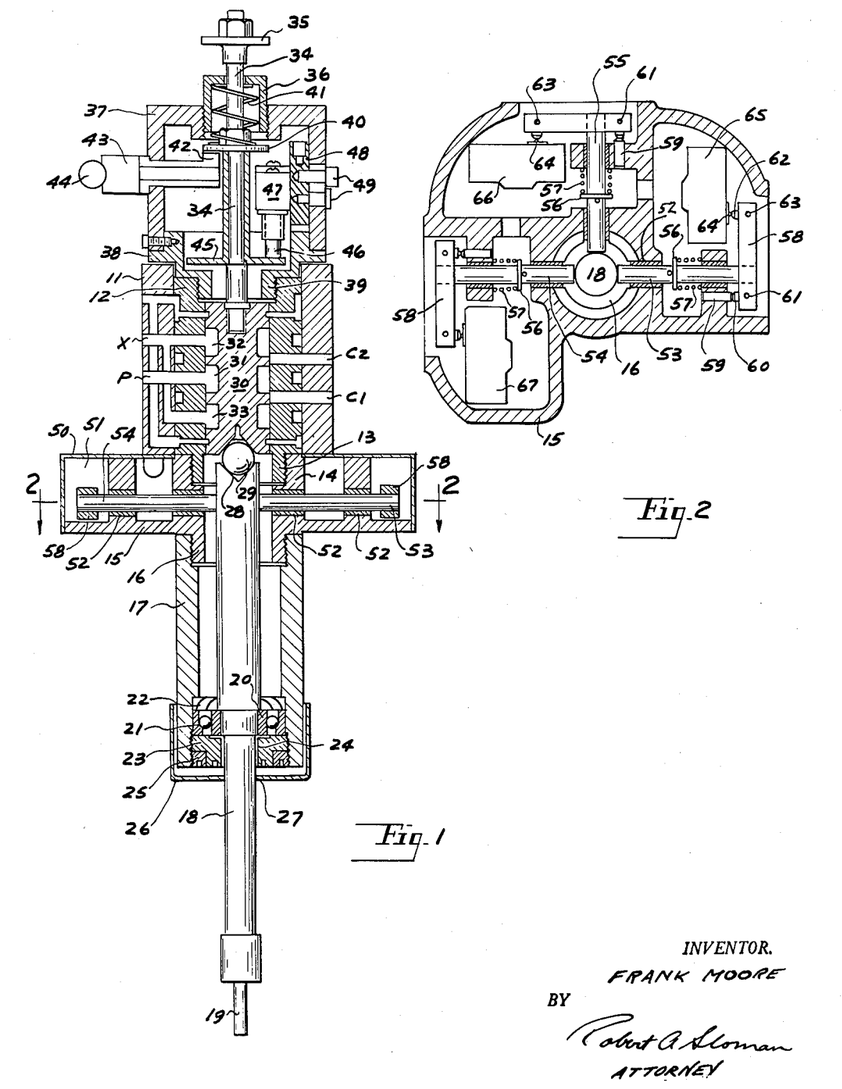
FIG. 1 is a vertical section of the present tracer.
FIG. 2 is a section on line 2—2 of FIG. 1.

Referring to the drawings, FIGURES 1 and 2 illustrate the preferred construction of the tracer employed in the present invention.

The tracer consists of a hollow body 11 with a ported valve sleeve 12 secured therein and including a depending threaded annular flange 13 projected down into the threaded hub 14 of the transverse switch body 15.

Said body includes a depending threaded flange 16 projected down into the threaded upper end of barrel 17 within which is axially positioned the elongated spindle 18. The spindle projecting below said barrel terminates in stylus 19, and intermediate its ends is supported upon the race 20 of the bearing 21 which is biased downwardly within said barrel by spring 22, and adjustably supported within said barrel by the nut 23, and secured by lock nut 25. A suitable clearance is provided at 24 between said spindle and adjusting nut whereby the spindle is free for universal tilting movements with respect to this bearing support as the stylus 19 traverses and responds to the profile of a template, hereafter described.

Cup 26 is loosely positioned around the lower end of barrel 17 and centrally secured at 27 to spindle 18. The axial cone shaped notch 28 at the upper end of the spindle supports ball 29 upon which rests the vertically movable valve 30 which has formed therein a series of annular grooves 31, 32 and 33.

The control stem 34 at its lower end is secured axially to valve 30 and at its upper end on the exterior of cap 37 has a disc 35 secured thereon to permit manual longitudinal adjustment of valve 30, should this be desired.

Stem 34 projects loosely through hollow adjusting nut 36 which is threaded down into hollow cap 37, whose lower end portion 38 has a flange 39, in turn threaded down into stationary sleeve 12.

Disc 40 is secured upon stem 34 below nut 36, and intermediate said disc and the upper end of said nut there is provided coiled spring 41 adapted to normally urge the valve and spindle downwardly into what is called a "negative" position of the valve, FIG. 1, and which would correspond to the position the valve would take when the stylus 19 is put out of contact with the template.

The extent of valve adjustment is approximately two to $15/1000$ of an inch. In the operation of the tracer the valve will assume an intermediate "neutral" position slightly above the position shown in FIG. 1 when the stylus is brought into initial contact with the template. In such "neutral" position pressure fluid supplied to the tracer at port P may enter opening 31, but is blocked from passage either into cylinder ports C1 or C2.

In the "negative" position of the valve, FIG. 1, above mentioned, such pressure fluid will pass from opening 31 into cylinder port C1 for direction to one end of a cylinder; and the exhaust from said cylinder returns through cylinder port C2 and into valve opening 32 and out through exhaust port X.

Should the stylus in traversing the profile of the template reach a rise or projection therein, the valve, due to the universal mounting of the spindle, will be projected upwardly slightly above said "neutral" position so that pressure fluid in opening 31 will be directed through cylinder port C2 to the opposite end of the cylinder. At the same time exhaust from the cylinder returns through cylinder port C1 and valve opening 33 for return to the fluid storage sump through exhaust port X.

Cam 42 is arranged slightly below disc 40 and is mounted upon rotatable shank 43 having right angularly arranged handle 44. Should the stylus be out of contact with the template the tracer valve 30 may be manually controlled by rotation of cam 42 until it supportably engages disc 40 for controlling vertical adjustments thereof.

For example, should the operator desire to stop inward feeding due to the "negative" position of valve 30, this can be done easily by rotation of cam 42 lifting the valve to a "neutral" position. Further lifting of the valve manually will cause a reversal of the fluid connections to the cylinder under tracer control, and cause relative outward feeding.

Disc 45 is secured upon stem 34 adjacent the lower end of cap 37 and is in contact with the reciprocal plunger 46 of the governor switch or safety limit switch 47 secured within said cap at 48 and including a pair of electrical connections 49 for breaking the electrical circuit within the tracer, should at any time there be an excessive deflection of the tracer spindle. This will have the effect of deenergizing the tracer control circuit to stop trace and feeding movements and prevent damag to the workpiece, the machine or tracer.

In addition to the hydraulic control valve 30 responsive to tilting movements of spindle 18, there is also provided a series of control limit switches within the said tracer and more particularly within the limit switch housing which includes body 15 and the cover 50 defining chamber 51 within which are arranged "in" limit switch 66, "right" limit switch 65 and "left" limit switch 67.

Figure 6:
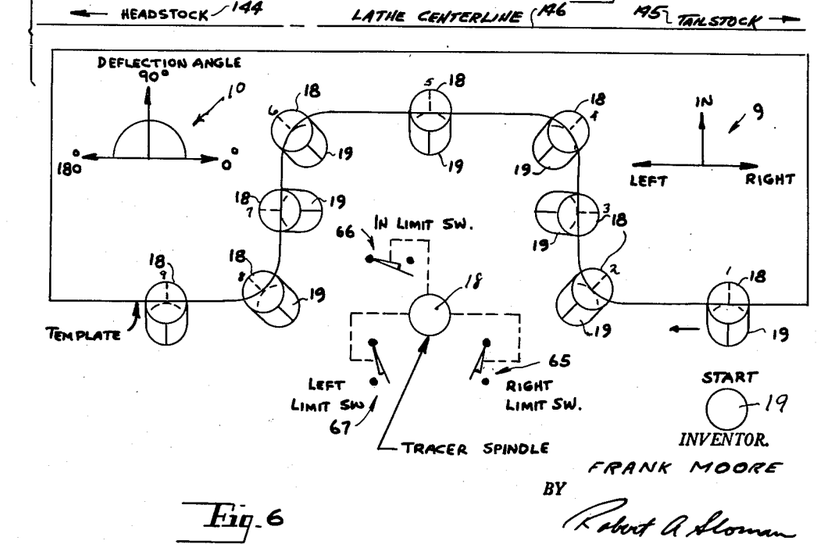
FIG. 6 is a diagrammatic view illustrating various positions of the tracer and associated switches and its deflection angles with respect to a 180 degree template.

As diagrammatically indicated in FIG. 6, for automatic traverse of the template profile in FIG. 6, i.e., through 180 degrees, three such limit switches are employed. For automatic control with respect to a template as in FIGS. 4 and 7 and 8, throughout 260 degrees, a fourth or "out" limit switch 100 is employed.

The body 15, as shown in FIG. 2, includes a series of pairs of right angularly related coplanar bores within which are positioned the pairs of preferably bronze bushings 52. Within each pair of aligned bushings there is slidably positioned the shafts 53, 54 and 55 respectively whose inner ends are right angular with respect to the shaft axes and operatively engage spaced portions of spindle 18. A washer 56 is secured upon each shaft intermediate its ends, and a coiled spring 57 surrounds each shaft interposed between said washer and an abutment forming a part of body 15, normally urging the said shafts radially inward for engagement with spindle 18.

Cross bars 58 are respectively carried and secured upon the outer ends of each shaft. Stops 59 within body 15 are in registry with corresponding adjusting screws 60 carried within each of said cross bars 58 and secured therein by set screw 61. The said stops 59 are adapted to limit inward movements of cross bars 58. The other ends of said cross bars having adjustable screws or contacts 62 secured as at 63 and adapted for respective registry with the corresponding button 64 of one of the limit switches 65, 66 and 67.

Figure 4:
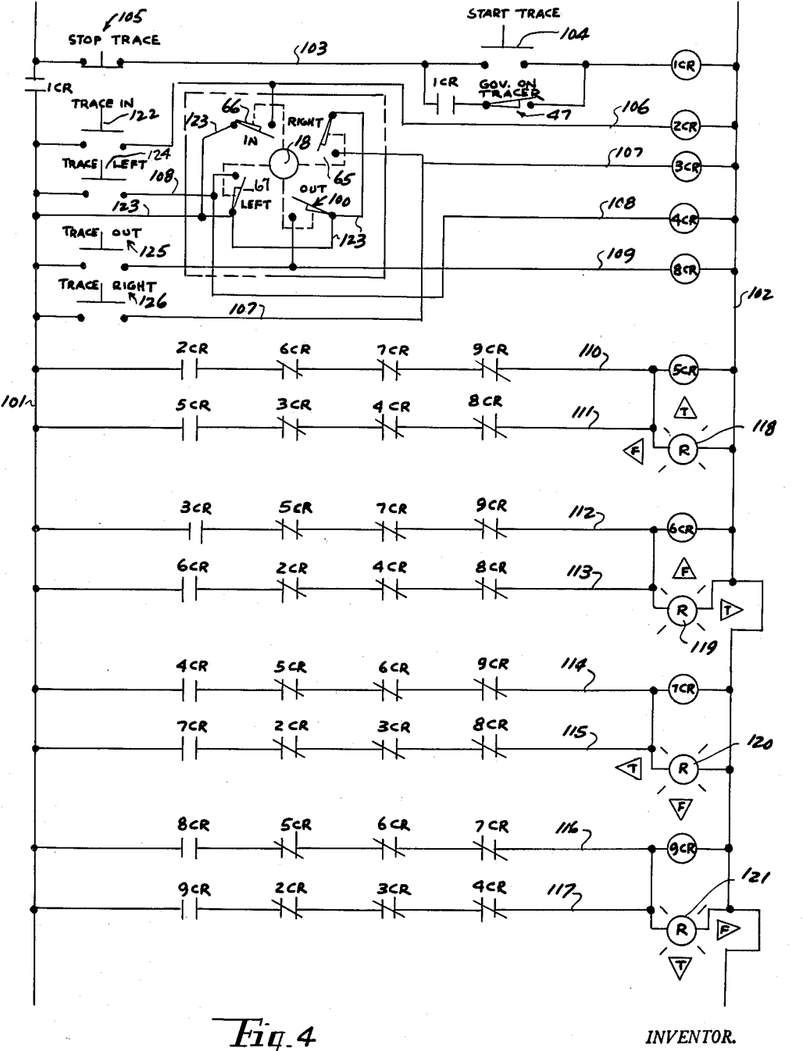
FIG. 4 is a portion of the electrical diagram for the present invention.

Each of the limit switches is of a conventional construction and in the diagrammatic views, such as in FIG. 4, the contacts of each of such switches are normally open so that deflection of the spindle at a certain angle will produce a corresponding outward radial movement of at least one of the associated shafts or a pair of right angularly related shafts as will appear hereafter. This will produce respectively a closing of the normally open contacts of the particular limit switch.

Hydraulic connections

Figure 3:
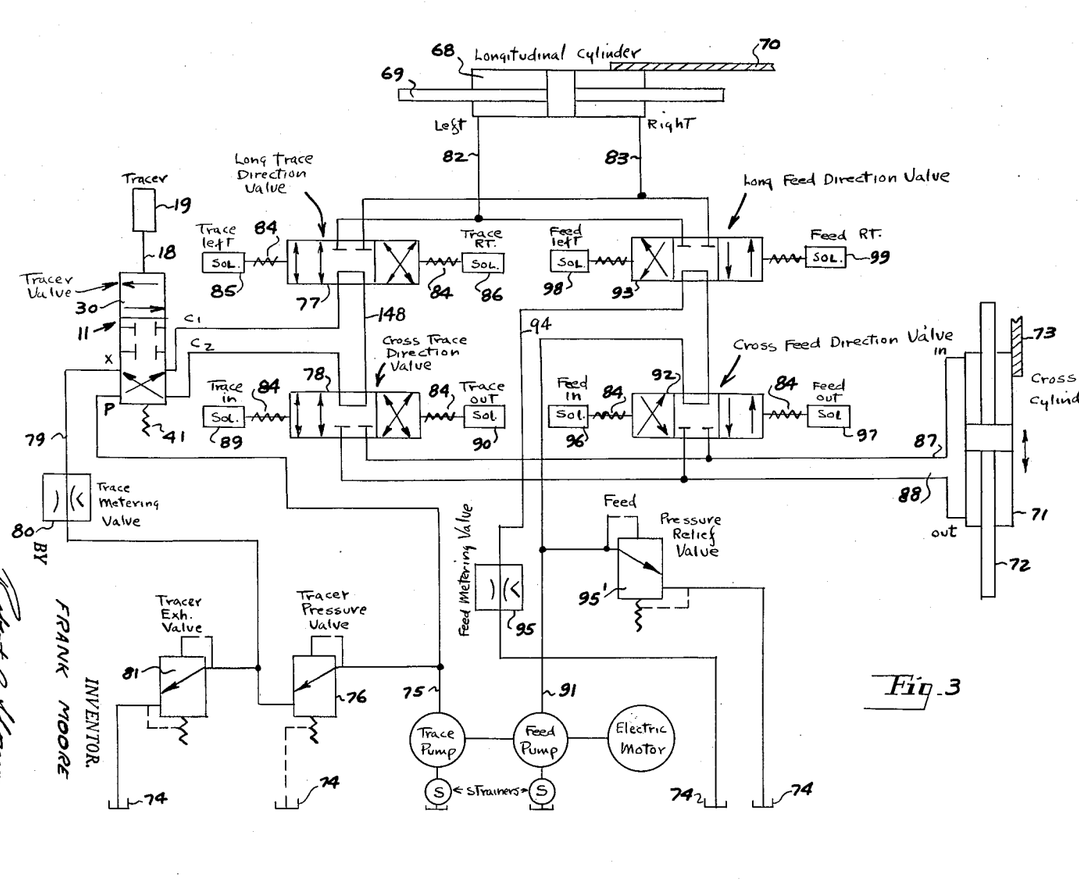
FIG. 3 is a hydraulic diagram for the present invention.

FIG. 3 is a diagram of the hydraulic mechanism employed in the present invention and includes longitudinal cylinder 68 movable with respect to its stationary piston and piston rod 69, which cylinder is joined to slide 70 fragmentarily shown, which may be, for illustration, the carriage of a lathe. Cross cylinder 71, normally mounted upon slide 70 for movement in unison at right angles to the direction of movement of slide 70 is reciprocal "in" and "out" relative to its stationary piston and piston rod 72.

Cross cylinder 71 is joined to slide 73, fragmentarily shown, for movement at right angles to slide 70, and for illustration may be the cross slide of a conventional lathe.

Figure 7:
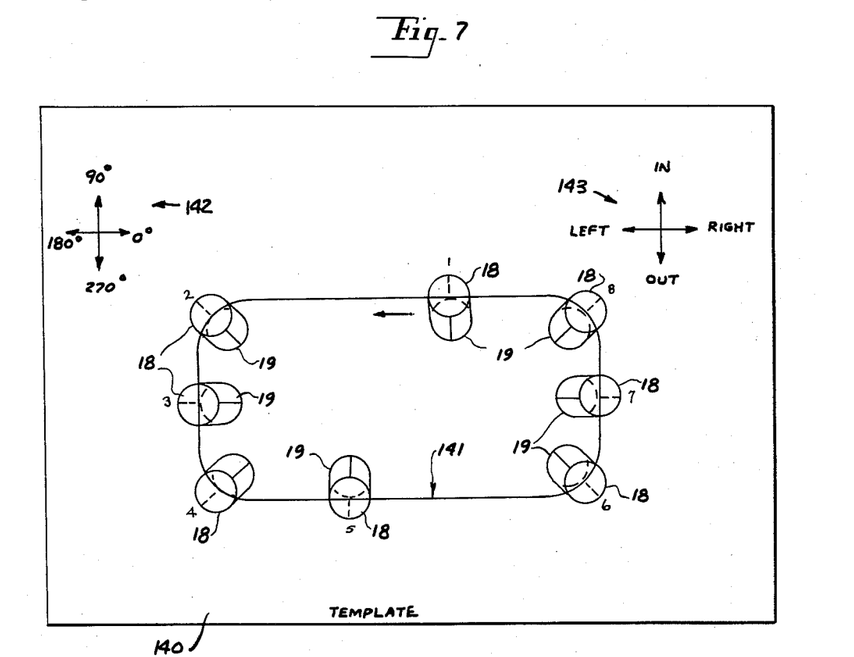
FIG. 7 is a similar diagrammatic view wherein the tracer traverses the template profile throughout 360 degrees.

For the purpose of illustration, in the present invention the tracer above described is adapted for mounting upon said cross slide with its axis at right angles to the direction of movement of both slides, and normally at right angles to the plane of the profile of the template, FIGS. 6 and 7, whereby the tracer stylus 19 is adapted to traverse said profile during feeding movements of one or both cylinders 68 and 71, and responsive to lateral thrust.

When the present invention is used upon a lathe, the cutting tool is normally arranged in spaced relation to the tracer upon said cross slide for movement in unison with said cross slide and with respect to a workpiece. Such workpiece, in a conventional manner, and the said template are mounted upon a stationary portion of the particular machine tool, such as the bed of the lathe. As diagrammatically shown in FIG. 3, there is a fluid supply sump 74 forming a part of the hydraulic unit employed. Pressure fluid is delivered by a suitable motor and pump through conduit 75 to tracer 11 for connection with inlet port P.

A suitable tracer pressure relief valve 76 is interposed in line 75 whereby a predetermined pressure of fluid may be established for direction to the tracer valve 30 which responds to deflection of spindle 19.

In the present invention there are employed 4 direction valves, two for each cylinder. There is a longitudinal trace direction valve 77 interconnected by suitable conduits with tracer 11 and longitudinal cylinder 68. There is a cross trace direction valve 78 connected to and controlled by said tracer and joined by suitable conduits 87 and 88 to cross cylinder 71. These two valves, one operating at a time, provide tracer control of one of said cylinders while the other cylinder will be under constant feeding from a separate and independent pressure fluid source delivered through conduit 91. This pressure fluid is directed to one or the other of cross feed direction valve 92 connected with cross cylinder 71 or the longitudinal feed direction valve 93 connected as by conduits 82 and 83 with opposite ends of longitudinal cylinder 68.

If one cylinder is under tracer control by either of the valves 77 or 78 then the other cylinder will be connected to one of the longitudinal feed or cross feed direction valves 92 or 93.

Pressure fluid delivered to the tracer through conduit 75 is directed from either of the cylinder ports C1 or C2 and eventually to either cylinder 68 or cylinder 71, and exhaust fluid from the opposite side of such cylinder will return to the other cylinder ports C1 or C2 and will be directed through the exhaust port X and conduit 79, through trace metering valve 80 and back to the fluid sump 74, there being a suitable exhaust back pressure valve 81 interposed in the connection for maintaining a predetermined back pressure in the exhaust line.

Each of the four direction valves includes a reciprocal valve element biased at its opposite ends by springs 84, normally maintaining in each case a central position.

Connected to opposite ends of each of the said direction valves are a pair of solenoids such as trace "left" solenoid 85 and trace "right" solenoid 86 on longitudinal trace directional valve 77. On cross trace direction valve 78 there is connected trace "in" solenoid 89 at one end and trace "out" solenoid 90 at its other end.

The constant feed fluid through conduit 91 is directed to either of the longitudinal or cross feed direction valves 92–93 and thence to one end of either of the cylinders not under tracer control. Exhaust from the opposite end of the cylinder receiving constant fluid returns through exhaust conduit 94 through feed metering valve 95 and back to sump 74.

Cross feed direction valve has feed "in" solenoid 96 at one end and feed "out" solenoid 97 at its other end. Longitudinal feed directional valve has feed "left" solenoid 98 at one end and feed "right" solenoid 99 at its other end, as set forth diagrammatically in FIG. 3.

As hereafter set forth in detail in connection with the operation of the present invention, each of the 4 direction valves has a separate control solenoid at each end thereof. For each of the two cylinders there are a trace directional valve and feed directional valve.

Primarily the control mechanism including the hydraulic connections and the electrical circuit under the control of the tracer is such that the tracer stylus traverses the template profile automatically and continuously without intervention of the operator, with the tracer controlling the movements of one cylinder and with traversing in a second direction at right angles thereto controlled by separate and independent source of pressure fluid.

The constant pressure fluid in conduit 91 to the direction valve not directly under tracer control is connected with a feed pressure relief valve 95' whereby a predetermined pressure is maintained. The exhaust fluid returning through conduit 94 passes through a manually set feed metering valve 95 and thence to sump 74.

Electrical circuits

Referring to the electrical diagram shown in FIGS. 4, 5 and 6, in addition to "in" limit switch 66, "right" limit switch 65 and "left" limit switch 67 above described in connection with FIG. 2, there is shown a fourth "out" limit switch 100 whereby the present tracer is adapted for traversing the profile of a template throughout 360 degrees as shown in FIG. 7.

Line 103 interconnects 110-volt 60 cycle power lines 101 and 102 with normally open "start trace" button or switch 104, and in cooperation with a second normally closed "stop trace" switch 105, for energizing the #1 control relay which may be referred to as 1CR, and in a like manner the remaining control relays as 2CR, 3CR, etc.

In parallel circuit with starting switch 104 there is provided a normally closed safety governor switch 47 and a normally open contact 1CR of #1 contact relay. A second normally open contact 1CR is also provided in power line 101.

The lead 106 between lines 101 and 102 includes #2 control relay and the normally open trace "in" switch 122. There is a branch from lead 106 connecting one of the contacts of the normally open "in" limit switch 66.

Lead 107 including #3 control relay connects one of the normally open contacts of the "right" limit switch 65 with power line 102. A separate lead 123 connects the other contact of limit 65 with line 101. Branch 107, from #3 control relay is joined to power line 101 with the normally open trace "right" switch 126 interposed.

Lead 108 connects one contact of "left" limit switch 67 with power line 102 and with #4 control relay interposed. The other contact of limit switch 67 is connected with power line 101 by lead 123. Branch line 108 interconnects one contact of limit switch 67 and powerline 101, and interposed therein the normally open trace "left" switch 124.

Circuit 109 including #8 control relay connects one contact of "out" limit switch 100 with powerline 102. The other contact of switch 100 connects powerline 101 through lead 123. Lead 109 is also connected with powerline 101 with normally open trace "out" switch 125 interposed.

Branch line 123 connects powerline 101 with the one contacts of each of the four limit switches 66, 67, 100 and 65. The other contacts of the limit switches are respectively connected to one of the control relays 2, 3, 4 and 8.

Lead 110 which includes #5 control relay interconnects powerlines 101 and 102 and includes in series normally open contacts 2CR and normally closed contacts 6CR, 7CR and 9CR of the respective control relays 2, 6, 7 and 9.

Holding circuit 111 for #5 control relay is connected with lead 110, and also interconnects powerlines 101 and 102 and includes the pilot light 118 which indicates the tracer operation when energized i.e., feed "left" trace "in."

Circuit 111 includes normally open contacts 5CR and normally closed contacts 3CR, 4CR and 8CR, forming respectively parts of the control relays 5, 3, 4 and 8.

Lead 112 connects #6 control relay with powerlines 101 and 102, and interposed in series are the normally open contacts 3CR and normally closed contacts 5CR, 7CR and 9CR forming a part of the respective control relays 3, 5, 7 and 9.

The holding circuit 113 for control relay #6 connected with lead 112 and also interposed between lines 101 and 102, includes the pilot light 119 which indicates that with #6 control relay energized the feed is "in" and tracing is to the "right." Line 113 includes normally open contacts 6CR and normally closed contacts 2CR, 4CR and 8CR of the respective control relays 6, 2, 4, and 8.

Lead 114 connecting #7 control relay with the powerlines includes normally open contacts 4CR and normally closed contacts 5CR, 6CR and 9CR of the corresponding control relay switches. Holding circuit 115 including pilot light 120 indicating trace "left" and feed "out" also includes normally open contacts 7CR and the normally closed contacts 2CR, 3CR and 8CR of the corresponding control relays.

Circuit 116 connects the powerlines with #9 control relay and includes normally open contacts 8CR and normally closed contacts 5CR, 6CR, 7CR from the corresponding relays. The holding circuit 117 for pilot light 121 on energization of the #9 control relay includes normally open contacts 9CR and normally closed contacts 2CR, 3CR and 4CR of the corresponding control relays. Pilot light 121 designates trace "out" and feed "right."

Figure 5:
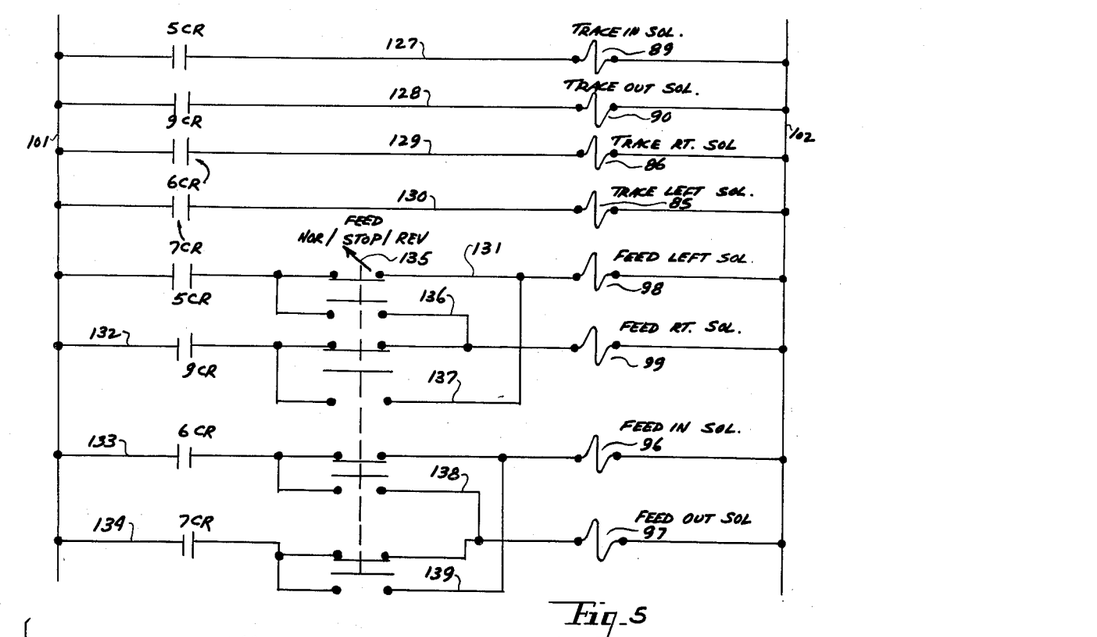
FIG. 5 represents another portion of the same electrical diagram.

In conjunction with the various pairs of solenoids for each direction valve, FIG. 3, there are additional branch lines in FIG. 5 which interconnect the powerlines with said solenoids. Circuit 127 includes the normally open contacts 5CR and trace "in" solenoid 89. Lead 128 provides power to trace "out" solenoid 90 on closing of normally open contacts 9CR from the corresponding relay switch.

Lead 129 through the normally open contacts 6CR provides power to the trace "right" solenoid 86; and lead 130 provides power through normally open 7CR to the trace "left" solenoid 85.

Simultaneously with the energizing of one trace controlling solenoid there will be an energization of one feed controlling solenoid. For example, in FIG. 5 lead 131 provides power to feed "left" solenoid 98 through another normally open contact 5CR, i.e., when number 5 relay is energized both solenoids 89 and 98 are activated.

Lead 132 provides power to feed "right" solenoid 99 through another normally open contact 9CR at the same time as trace "out" solenoid 90 is activated.

Circuit 133 provides power to feed "in" solenoid 96 upon energization of #6 control relay and closing of the normally open contacts 6CR. Circuit 134 provides power to solenoid 97 upon closing of the normally open contacts 7CR of the #7 control relay.

In conjunction with constant feeding under the control of solenoids 96, 97, 98 and 99 there is interconnected in their respective circuits a normal feed, stop and reverse selector switch 135, with respective interconnecting branch lines 136, 137, 138 and 139, FIG. 5, whereby changing the switch 135 from the position shown to the second position will effect a reversal of the operation produced by the energizing of the feed controlling solenoids 96, 97, 98 and 99. An intermediate position of switch 135 cuts off all feeding.

For example, in normal operation with the selector switch 135, as shown in FIG. 5 relative movement of spindle 18 in FIG. 7 with respect to template 140 will be in a counter clockwise direction. On operation of the selector switch to its second position, there will still be an automatic traverse of said template, in the reverse direction.

Referring to FIG. 7, template 140 has an internal profile 141 and there is diagrammatically shown a series of numbered and angular positions 1 through 8 of the tracer spindle 18 as the stylus 19 traverses in a counter clockwise direction said profile. The deflection angles of spindle 18 for these illustrative positions are diagrammatically shown.

The protractor 142 in the illustration merely shows the corresponding right angular positions between zero and 360 degrees. The other in-set 143 in FIG. 7, merely indicates by arrow the various directions of feeding or tracing.

Set out herebelow is a schedule indicating the deflection angle, the energizing of which limit switches, the direction in which the tracer seeks, and the normal feed direction for each of the 8 positions shown in FIG. 7 and certain intermediate positions.

| Template Position | Deflection Angle | Limit SW Closed | Tracer Seeks | Nor. Feed Direction |
|---|---|---|---|---|
| 1 | 90 | In | In | Left. |
| 2 | 136 | In—Left | In | Left. |
| Between 2 and 3 | 137 | Left | Left | Out. |
| 3 | 180 | Left | Left | Out. |
| 4 | 225 | Left—Out | Left | Out. |
| Between 4 and 5 | 226 | Out | Out | Right. |
| 5 | 270 | Out | Out | Right. |
| 6 | 315 | Out—Right | Out | Right. |
| Between 6 and 7 | 316 | Right | Right | In. |
| 7 | 0 | Right | Right | In. |
| 8 | 45 | Right—In | Right | In. |
| Between 8 and 1 | 46 | In | In | Left. |

Set out herebelow is a schedule also on the same as applied to 180 degree tracing between positions 1–9 of FIG. 6.

| Position | Deflection Angle, degrees | Limit Switch Closed | Tracer Seeks | Normal Feed Direction |
|---|---|---|---|---|
| 1 | 90 | In | In | Left. |
| 2 | 45 | In—right | In | Left. |
| Between 2 and 3 | 44 | Right | Right | In. |
| 3 | 0 | Right | Right | In. |
| 4 | 45 | Right—In | Right | In. |
| Between 4 and 5 | 46 | In | In | Left. |
| 5 | 90 | In | In | Left. |
| 6 | 135 | In—Right | In | Left. |
| Between 6 and 7 | 136 | Left | Left | Out. |
| 7 | 180 | Left | Left | Out. |
| 8 | 135 | Left—In | Left | Out. |
| Between 8 and 9 | 134 | In | In | Left. |

Operation

Assume the follower is in start position, FIG. 6, and the pumps, FIG. 3, are running and developing fluid pressure. With trace metering and feed metering valves 80 and 95 closed, depress start trace button 104, FIG. 4, energizing through lead 103 1 control relay (ICR) whose normally open contacts (ICR) close to seal (ICR) and energize the tracer control circuit. ICR is sealed or held through the normally closed contact of the governor or safety limit switch 47 on the tracer. The governor or safety limit switch on the tracer opens its normally closed contact on over-deflections of the tracer through disc 45, plunger 46, FIG. 1, to unseal ICR thus de-energizing the tracer control circuit to stop all trace and feed movements and prevent damage to workpiece and machine. With ICR sealed depress trace "in" button 122, FIG. 4, energizing through lead 106, 2CR whose normally open contact in circuit 110 closes energizing 5CR through normally closed contacts of 6CR, 7CR and 9CR. 5CR is sealed in by one of its normally open contacts, circuit 111 through normally closed contacts of 3CR, 4CR and 8CR so that when the trace "in" button is released de-energizing 2CR, 5CR remains energized. The trace "in"-feed "left" pilot light 118 is energized along with 5CR to give visual indication of tracer operation.

Another normally open contact of 5CR circuit 127, FIG. 5, closes energizing trace "in" solenoid 89 while a third normally open contact of 5CR circuit 131 energizes the feed "left" solenoid 98 (feed normal, stop, reverse selector switch 135 is shown in normal position).

When the trace "in" 89 and feed "left" 98 solenoids are energized, the following hydraulic action takes place in FIG. 3. Fluid from the tracer pump passes through conduit 75 to the pressure (P) port of the tracer valve 30. The tracer spindle 18 and 19 (being away from the template), FIG. 6, is undeflected at this time so the tracer valve spool 30, FIG. 1, is urged by its spring 41 to take the position shown on the schematic view, FIG. 3, and in FIG. 1, which directs the fluid from port P to port C1 of the tracer valve.

Conduit C1 carries the fluid from port C1 to the longitudinal trace direction valve 77, both solenoids 85 and 86 of which are deenergized at this time so that the fluid passes through this valve and on through conduit 148 to the cross trace direction valve 78 whose trace "in" solenoid 89 is energized causing its spool to direct the fluid into the conduit 87 connecting with the cross cylinder 71 "in" port.

The cross cylinder moves inwardly carrying the tracer 11 suitably mounted on slide 73 toward position 1 on the template, FIG. 6. Fluid being displaced from the "out" port of the cross cylinder is carried by conduit 88 to the cross trace direction valve 78 joined with C2 port of the tracer valve 30 from which it is directed to the tracer exhaust (X) port then into conduit 79 connecting with the trace metering valve 80.

The trace metering valve is manually opened enough to give the desired speed of approach to the template and fluid passing through this valve is returned to the tank 74 through the tracer exhaust valve 81.

The cross cylinder 71 continues to carry the tracer 11 toward the template, FIG. 6, until the stylus 19 makes contact with the template causing the tracer spindle 18 to be deflected inwardly position No. 1 (at a 90° deflection angle in this case) and displace the tracer valve spool 30 to neutral position thus stopping cross cylinder movement by cutting off its fluid flow. The trace metering valve is now manually opened so that the tracer can take full control of the tracing slide 73.

The feed metering valve 95, FIG. 3, is now manually opened enough to give the desired feed rate and fluid from the feed pump passes through the cross feed direction valve 92 (its solenoids 96 and 97 are deenergized at this time) into the longitudinal feed direction valve 93 whose feed "left" solenoid 98 is energized to direct the fluid to the "left" longitudinal cylinder port through conduit 82 causing the longitudinal cylinder 68 to move "left" and carry the tracer 11 with it. Fluid being displaced from the right cylinder port is returned via conduit 83, 94 to the tank through the longitudinal feed direction valve 93 and the feed metering valve 95.

The tracer stylus follows along the path or profile described by the template, FIG. 6, and since it is directly connected to the cross cylinder 71 through the cross trace direction valve 78, inward slopes of the templates resulting in negative spindle deflection displace the tracer valve spool 30 to cause fluid to be directed through conduit 87 to "in" port of the cross cylinder causing it to carry the tracer inwardly until the error is corrected and the tracer spool 30 returns to neutral (slightly above the position in FIG. 1) and stops cross cylinder in movement. In like manner, outward slopes of the template result in positive spindle deflection which displaces the tracer valve spool to direct fluid through conduit 88 "out" port of the cross cylinder causing it to carry the tracer outwardly until the error is corrected causing the tracer spool to return to neutral and stop movement of the cross cylinder.

Returning to the electrical system, FIG. 4, when the stylus 19 contacts the template at point 1, FIG. 6, the tracer spindle 18 tilts inwardly at a 90° deflection angle and the "in" limit switch 66 closes its contacts energizing 2CR through leads 123, 106. This prepares for direction changes, but as 5CR is already sealed through circuit 111 having been energized when the trace "in"

button 122 was depressed, no further action takes place until point 2 is reached.

At point 2, the tracer spindle 18 tilts at a deflection angle of approximately 45°, FIG. 6, so that both "in" and "right" limit switches 66, 65 close their contacts. This energizes 3CR through lead 107 but since 2CR and 5CR were previously energized, there is no further action until a location slightly beyond point 2 is reached where the deflection angle of the tracer spindle becomes approximately 44° opening the "in" limit switch contact 66 but maintaining the "right" limit switch contact 65 closed.

When the "in" limit switch contact opens, 2CR in circuit 106 is deenergized and since 3CR remains energized ("right" limit switch contact 65 closed) 5CR is deenergized and drops out. This happens because the normally open contact of 2CR which was energizing 5CR through the normally closed contacts of 6CR and 7CR and 9CR is now opened (2CR was deenergized) and the normally open contact of 5CR which was holding through normally closed contacts of 3CR, 4CR and 8CR can no longer hold because normally closed 3CR circuit 111 contact is open (3CR is energized).

When 5CR drops out, solenoids trace "in" 89 and feed "left" 98 and the trace "in"-feed "left" pilot light 118 are deenergized, and at the same time the normally closed contact of 5CR, which was preventing energization of 6CR by the normally open contact of 3CR, closes and 6CR is energized and sealed. When 6CR is energized the trace "right"-feed "in" pilot light 119 is energized giving visual indication of tracer operation. Also normally open contacts of 6CR close and energize the trace "right" solenoid 86 and the feed "in" solenoid 96 (feed normal/stop/reverse switch 135 is normal position), FIG. 5.

The above changes in the electrical system result in the following hydraulic action. When the trace "in" solenoid 89 is deenergized, the cross trace direction valve 78 springs to center position disconnecting the tracer cylinder ports from the cross cylinder ports. When the feed "left" solenoid 98 is deenergized, the longitudinal feed direction valve 93 springs to center position disconnecting the feed pump and feed metering valve 95 from the longitudinal cylinder ports. When the trace "right" solenoid 86 is energized, tracer cylinder 1 port is connected through conduit 83 to longitudinal cylinder 68 "right" port and tracer cylinder 2 port is connected through conduit 82 to longitudinal cylinder left port by the shifting of the longitudinal trace direction valve spool 77. Energization of the feed "in" solenoid 96 shifts the cross feed direction valve spool to connect the feed pump through conduit 87 with the cross cylinder "in" port and the feed metering valve 95 through conduit 88 to the cross cylinder "out" port. The result of this action is that the tracer takes control of the longitudinal cylinder 68 seeking "right" while a steady inward feed is applied to the cross cylinder 71.

6 control relay remains energized and the trace "right"-feed "in" action continues with the tracer maintaining contact between stylus and template by hydraulic control of the longitudinal cylinder location until position 4 is reached, FIG. 6.

At position 4, the deflection angle of the tracer spindle 18 becomes approximately 45° causing the contacts of both "right" and "in" limit switches 65 and 66 to be closed. At this point nothing other than energization of 2CR occurs because 3CR and 5CR were previously energized.

When the stylus 19 has moved to a position slightly beyond 4 where the deflection angle becomes approximately 46° the contacts of the "right" limit switch 65 open while those of the "in" limit switch 66 remain closed. This deenergizes 3CR whose normally open contact circuit 112 opens deenergizing 6CR and the trace "right"-feed "in" pilot light 119. 6CR is unsealed because its holding contact is in series circuit 113 with the normally closed 2CR contact which is open at this time because 2CR is energized. When 6CR drops out, its normally closed contact closes, allowing the normally open contact of 2CR to energize 5CR and the trace "in"-feed "left" pilot light 118. 5CR seals in on its normally open holding contact circuit 111 through normally closed contacts of 3CR, 4CR and 8CR.

When 6CR is deenergized, its normally open contacts open de-energizing the trace "right" 86 and feed "in" solenoids 96. When 5CR is energized its normally open contacts close, energizing the trace "in" and feed "left" solenoids 89, 98. This transfers tracer control from the longitudinal cylinder 68 seeking "right" to the cross cylinder 71 seeking inwardly. It also transfers feed from cross cylinder "in" to longitudinal cylinder "left."

The tracer stylus continues moving left, FIG. 6, and following the template by causing the cross cylinder to move in on inward slopes (negative deflection) and out on outward slopes (positive deflection).

When the stylus arrives at position 6, the deflection angle of the tracer spindle becomes approximately 135° causing the "in" and "left" limit switches 66, 67 to close their contacts energizing 2CR and 4CR. Since 2CR is energized first, 5CR remains energized until the stylus moves to a point just beyond position 6 where the deflection angle of the tracer spindle becomes approximately 136° causing the "in" limit switch contact 66 to open, while the "left" limit switch 67 remains closed. This de-energizes 2CR whose normally open contact circuit 110 in series with normally closed contacts of 6CR and 7CR, also 9CR opens deenergizing 5CR and the trace "in" feed left pilot light 118. 5CR is unsealed because its holding contact is in series circuit 111 with the normally closed 4CR contact which is open at this time because 4CR is energized. When 5CR drops out, its normally closed contact closes, allowing the normally open contact of 4CR circuit 114 to energize 7CR and the trace "left" feed "out" pilot light 120. 7CR seals in on its normally open holding contact circuit 15 through normally closed contacts of 2CR, 3CR and 8CR.

When 5CR is deenergized its normally open contacts open deenergizing the trace "in" and feed "left" solenoids 89, 98. When 7CR is energized its normally open contacts leads 130, 134, FIG. 5, close, energizing the trace "left" and feed "out" solenoids 85, 97. This transfers tracer control from the cross cylinder 71 seeking "in" to the longitudinal cylinder 68 seeking "left." It also transfers feed from longitudinal cylinder "left" to cross cylinder "out."

The tracer stylus 19 continues to move out, FIG. 6, maintaining contact with the template by causing the longitudinal cylinder to move "left" on negative deflections and "right" on positive deflections until position 8 is reached.

At position 8, the spindle deflection angle becomes approximately 135° causing the "in" and "left" limit switches 66, 67 to close their contacts. Since the "left" limit switch was previously closed, nothing other than energization of 2CR takes place until a point just beyond 8 is reached where the spindle deflection angle becomes approximately 134° opening the "left" limit switch contact 67 while the "in" limit switch contact 66 remains closed.

This degenerizes 4CR and since 2CR is energized, 7CR and the trace "left"-feed-"out" pilot light 120 are degenerized while 5CR and the trace "in"-feed left pilot light 118 is energized and sealed.

When 7CR is deenergized its contacts open, deenergizing the trace "left" 85 and feed-"out" solenoids 97. When 5CR is energized its contacts close, energizing the trace "in" feed "left" solenoids 89, 98. This transfers tracer control from the longitudinal cylinder 68 seeking "left" to the cross cylinder 71 seeking "in." It also transfers feed from cross cylinder "out" to longitudinal cylinder "left." The tracer stylus now moves left and maintains contact with the template by causing the cross cylinder to move "in" on inward slopes (negative deflection) and "out" on outward slopes (positive deflection).

From the preceding explanation, it can be seen that this follower will trace the contour of a template or model in two dimensions, FIG. 6, and that if it is mounted on machine tool such as a lathe in spaced relation to a cutting tool so that the follower's position relative to the template is the same as the cutting tools position relative to the workpiece the follower will guide the cutting tool in a path determined by the shape of the template or model to produce a workpiece whose contour is identical to that of the template or model.

This follower, which will trace in 3-directions, namely "left," "right" and "in" is ideally suited for application to machine tools of the lathe type. For application to machine tools of the milling machine type, FIG. 8, on which it would be necessary to trace in 4-directions namely, "left," "right," "in" and "out," a follower of the same construction would be used with the addition of a fourth limit switch 100 to be known as the "out" limit switch and mounted directly opposite the "in" limit switch 66, FIG. 4, so that outward deflections of the tracer spindle would result in the closing of the "out" limit switch contacts.

The "out" limit switch contacts are connected to operate an 8th relay circuit 109, FIG. 4, and contacts of the 8th relay are interlocked with contacts of 5CR, 6CR and 7CR so that a 9th relay circuit 116 together with a trace "out"-feed "right" pilot light 121 are energized in proper sequence when the tracer deflection angle was changing from approximately 225 degrees to approximately 226° point 4, FIG. 7. The contacts of the 9th relay, FIG. 5, are connected to energize the trace "out" solenoid 90 (which is also shown on the hydraulic diagram FIG. 3) and the feed "right" solenoid 99 when the feed normal/stop/reserve selector switch is in normal position as shown.

Figure 8:
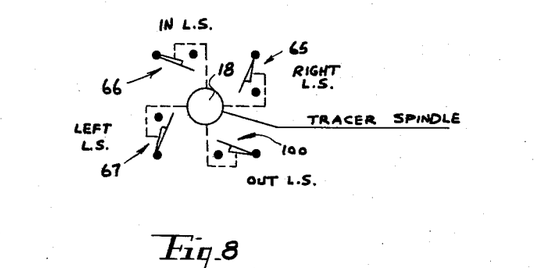
FIG. 8 is a diagrammatic view of the switch arrangement thereof.

When the deflection angle changed from 315 degrees to 316 degrees point 6, FIG. 7, the condition of the "out" and "right" limit switch contacts 100, 65 would change from both closed to "out," open and "right" closed resulting in deenergization of the 9th relay together with the trace "out" -feed "right" pilot light 121 and the associated trace "out" - feed "right" solenoids 90, 99 and energization of the 6th relay, the trace "right" feed "in" pilot light 119 and the trace "right" 86 feed "in" 96 solenoids. A template and schematic view of the follower with 4 limit switches is shown in FIG. 7 and the schematic drawing of the electrical circuit used with this 4 limit switch follower is shown in FIGS. 4, 5, and 8. The hydraulic circuit for both types of follower is the same and is shown in FIG. 3.

The selector switch 135 feed normal/stop/reverse is used to reverse the progression around the template from "left" or counter clockwise when it normal position and to "right" or clockwise in the reverse position.

Referring to FIG. 4, the electrical tracing circuit may be energized initially by the trace "in" push button 122 as above described, where the stylus has the relative position shown in FIG. 6 with respect to the template. Should the stylus, however, be in such a position that the initial direction of tracer seeking would be to the "left" such as to position 7, FIG. 6, and with the stylus in position outwardly thereof, then the trace "left" button 124 would be pushed to energize the tracer circuit.

If it is desired, to trace "out" as from a central portion of template 140 to profile 141, then the trace "out" button 125 would be activated. Alternately, if the stylus from a central position, FIG. 7, is to trace "right" button 126 is activated. The electrical tracing circuit may be de-energized at any time by pressing the stop trace button 105, FIG. 4.

Having described my invention, reference should now be had to the following claims.

I claim:

1. A tracer for an automatic control system comprising an upright body, a spindle universally mounted within said body and depending therefrom terminating in a stylus adapted to engage the profile of a template, an axially reciprocal fluid control valve in said body engagable with and responsive to deflections of said spindle, adapted for transmitting pressure fluid supplied to said body to one of two cylinder ports, valving means respectively connected to said cylinder ports adapted for selectively directing the pressure fluid under the control of said valve a series of right angularly related normally open limit switches in said tracer spaced around and from said spindle, one and a maximum of two adjacent limit switches being adapted to close on angular deflection of said spindle responding to changes in template profile, adapted to control such valving means, a series of radial coplanar right angularly related limit switch operating shafts slidably mounted upon the tracer with their inner ends resiliently biased into engagement with said spindle, a cross arm on the outer end of each shaft, and a contact on each arm normally engaging a corresponding limit switch contact.

2. A tracer comprising an upright body, a spindle universally mounted within said body and depending therefrom terminating in a stylus adapted to engage the profile of a template, a series of right angularly related limit switches in said tracer spaced around and from said spindle, one and a maximum of two adjacent limit switches being adapted to close on angular deflection of said spindle responding to changes in template profile, a series of radial coplanar right angularly related limit switch operating shafts slidably mounted upon the tracer with their inner ends resiliently biased into engagement with said spindle, a cross arm on the outer end of said shaft, and a contact on each arm normally engaging a corresponding limit switch contact.

3. A tracer for an automatic control system comprising an upright body, a spindle universally mounted within said body and depending therefrom terminating in a stylus adapted to engage the profile of a template, an axially reciprocal fluid control valve in said body engageable with and responsive to deflections of said spindle, adapted for transmitting pressure fluid supplied to said body to one of two cylinder ports, valving means respectively connected to said cylinder ports adapted for selectively directing the pressure fluid under the control of said valve a series of right angularly related limit switches in said tracer spaced around and from said spindle, one and a maximum of two adjacent limit switches being adapted to close on angular deflection of said spindle responding to changes in template profile adapted to control said valving means.

4. The tracer of claim 3, a series of separately operatable trace and feed control relays respectively connected with said limit switches whereby any of the following relay control conditions will alternately exist namely: trace "in" feed "left"; trace "right" feed "in"; trace "left" feed "out"; trace "out" feed "right," and an electrical circuit including a power source interconnecting said limit switches and control relays whereby the spindle through changes in the direction of its angular deflections in responding to the template profile automatically establishes one of the aforesaid control relay trace and feed conditions.

5. The tracer of claim 3, a series of alternately operable pairs of trace and feed control solenoids, a series of separately operable control relays each respectively connected to a limit switch and a pair of said solenoids whereby any of the following solenoid control conditions will alternately exist, namely: trace "in" feed "left"; trace "right" feed "in"; trace "left" feed "out"; trace "out" feed "right," and an electrical circuit including a power source interconnecting said limit switches and control relays whereby the spindle through changes in the direction of its angular deflections in responding to the template profile automatically establishes one of the aforesaid control solenoid trace and feed conditions.

6. The tracer of claim 3, a series of trace control and feed control solenoids arranged in alternately operable pairs, one trace and one feed control solenoid in each pair, a series of separately operatable control relays, each connected respectively to a limit switch, and to one of said pairs of solenoids, an electrical circuit connecting said limit switches, relay switches and solenoids and including a power source, each of said control relays having a plurality of normally open contacts connecting on energization one of said pairs of solenoids with said power source.

References Cited in the file of this patent

UNITED STATES PATENTS

| | | |
|---|---|---|
| 1,668,518 | Shaw et al. | May 1, 1928 |
| 2,787,437 | Turchan | Apr. 2, 1957 |
| 2,835,466 | Rosebrook | May 20, 1958 |
| 2,841,356 | Glaser | July 1, 1958 |

FOREIGN PATENTS

| | | |
|---|---|---|
| 771,787 | Great Britain | Apr. 3, 1957 |